3,395,984
BORON PHOSPHATE HAVING HIGH SURFACE AREA AND METHOD FOR PRODUCTION THEREFOR
John Frederick Collins, Chessington, England, assignor to United States Borax & Chemical Corporation, Los Angeles, Calif.
No Drawing. Filed Sept. 9, 1964, Ser. No. 395,324
Claims priority, application Great Britain, Sept. 13, 1963, 36,235/63
2 Claims. (Cl. 23—203)

ABSTRACT OF THE DISCLOSURE

Unsupported boron phosphate having a high surface area and high catalytic activity is produced by heating about equimolar amounts of phosphoric acid and a trialkyl borate or ammonium biborate to a temperature of at least about 50° C. to form a gel and then drying the gel. The product is a porous material having a high surface area of at least 100 square meters per gram.

This invention relates to boron compounds, and in particular to an improved boron phosphate having a high surface area and to methods for producing such compositions.

Boron phosphate is known to be a useful catalyst for various reactions, notably the synthesis of caprolactam by means of a Beckmann rearrangement of cyclohexanone oxime, the synthesis of melamine from urea, and the production of olefins of high molecular weight by the dehydration of long chain alcohols. Unfortunately, boron phosphate as usually made has a relatively low surface area, namely, 5–10 square meters per gram, so that its catalytic activity is not as high as is desirable. To some extent this can be countered by depositing the boron phosphate on a carrier of high surface area, e.g., silica or alumina gel. However, this is not always desirable.

The present invention provides a method whereby a novel unsupported boron phosphate of high surface area and catalytic activity can be obtained.

According to this invention, unsupported boron phosphate in a form suitable for use as a catalyst is made by heating ammonium biborate or a trialkyl borate, in which the alkyl groups contain at least 2 carbon atoms, with phosphoric acid to a temperature of at least about 50° C. until a gel is formed, with or without the intermediate formation of a single liquid phase, and drying the gel so produced. Preferably the mixture of borate and phosphoric acid is stirred or otherwise agitated during the heating, and it is very advantageous to use equivalent, that is approximately equimolecular, proportions of the two reactants.

It is preferred to use trialkyl borates in which the alkyl groups contain from 2 to about 6, and especially 3 to 6, carbon atoms, tri-n-propyl borate and triisopropyl borate being especially preferred. The phosphoric acid can be anhydrous or can contain some water, concentrations of 80–95% being especially suitable. Lower concentrations such as down to about 65% can be used, but are not preferred.

The trialkyl borate can be charged to the reaction vessel as such, or it can be formed in situ by reaction between boric acid and the corresponding alcohol, provided always that at least part, and preferably substantially all, of the boric acid has reacted to form the ester before the phosphoric acid is added. The reaction of the trialkyl borate with the phosphoric acid should be carried out under conditions which allow the by-product alcohol to escape from the reaction zone, that is, the boiling temperature of the reaction mixture. The temperature used may, for example be initially between the boiling point of the alcohol and a level about 30° to 50° C. above it, and will rise as the reaction proceeds.

If desired, the reaction between the trialkyl borate and phosphoric acid can be effected in the presence of an inert solvent for the reactants to cause or assist the formation of a single phase containing at least some of both reactants. In such cases the alcohol corresponding to the alkyl groups in the trialkyl borate is conveniently used so as to avoid the necessity for an additional solvent recovery operation, but other solvents, including other alcohols, can be used if desired.

When the reactants do not themselves initially form a single liquid phase they will normally do so, at least to some extent, on heating; however, gel formation may follow very rapidly, so that the formation of the single liquid phase may in practice not always be observed.

The gel can be dried at any temperature below about 300°–350° C., but it is usually preferred to use relatively low temperatures, such as about 50°–140° C., if desired in combination with reduced pressure.

As heretofore stated, the present invention provides a process whereby a superior boron phosphate of high surface area, eminently suitable for use as an unsupported catalyst, is obtained. Thus, surface areas in the neighborhood of at least 100 and preferably about 300 square meters per gram and even more have been obtained. Such boron phosphates are highly active catalysts for the reactions above mentioned.

The following examples illustrate the invention but are not to be considered as limiting the invention to the specific examples given.

Example I

Equimolar proportions of tri-n-propyl borate and 100% phosphoric acid were mixed and heated together at a temperature of about 120° C. As the reaction proceeded, the pot temperature rose. At first two separate layers formed, but as the temperature rose, the upper (ester) layer became absorbed in the lower, giving a homogeneous single phase liquid, which very quickly changed into a thick, clear gel. This gel was broken up and dried for 2 hours at 120° C. The product was a white solid consisting of glass-like particles and having a surface area of 296 m.$^2$/g.

Example II

The procedure of Example I was repeated except that the phosphoric acid was 90% concentrated. The gel was dried at 110° C. for 2 hours, and the product, which was similar in appearance to that of Example I, was found to have a surface area of 373 m.$^2$/g. On being heated to 300° C. it lost 8.0% of its weight, corresponding to about one molecule of water for each molecule of boron phosphate.

In a modification of this procedure the gel was dried at 65°–70° C. in a vacuum oven.

Example III

Equimolar proportions of tri-isopropyl borate and phosphoric acid (86.6%) were mixed and heated at the boiling temperature of the mixture, whereupon a thin, milky solution was formed which quickly changed to a clear thick gel. This was dried at 120° C. to give a product similar to that obtained in Example II.

Example IV

Equimolar proportions of tri-sec-butyl borate and 100% phosphoric acid were heated together as in Example I, and the resulting gel dried overnight at 120° C. The product had the form of large buff-colored lumps, and its surface area was 141 m.$^2$/g.

Example V

Fifteen grams of boric acid were dissolved in 100 ml. of n-propanol in a flask fitted with a reflux column and a variable ratio reflux head, and the solution distilled at a reflux ratio of 6:1 until 65 ml. of distillate had come over. The residue was allowed to cool, and then 23.8 g. of 100% phosphoric acid was added. The mixture was warmed as in Example I, and the resulting gel was dried at 230° C. The product was dark in color and had a surface area of 105 m.²/g.

Example VI

Example V was repeated, using 100 ml. of sec-butanol instead of the n-propanol, removing 60 ml. of distillate, and drying the gel at 130° C. The product was a discolored, white powder of surface area 72 m.²/g.

Figures for surface areas given throughout this specification were obtained by the BET method (see Brunaur, Emmett, and Teller, J. Amer. Chem. Soc., vol. 60, p. 309, 1938).

In a modifictaion of the invention as above described, the trialkyl borate is replaced by ammonium biborate $$[(NH_4)_2 \cdot B_4O_7 \cdot 4H_2O]$$

When this compound is mixed with the phosphoric acid, a thick paste is first formed which, however, becomes thin as the temperature rises. The boron phosphate is obtained by drying the paste at a temperature above 100° C. and up to about 350° C. at normal pressure, or at somewhat lower temperatures under reduced pressure. When the paste is dried at a temperature below about 150° to 200° C., or partially dried at such temperature and finally dried at a higher temperature, a dense, hard product is obtained, while if it is heated directly to a high temperature, such as 200°–350° C., frothing occurs and a porous product is obtained.

The products obtainable in this way have surface areas which, while much lower than those obtainable from the trialkyl borates, are yet more than twice as high as those of a typical unsupported boron phosphate catalyst made by the conventional process.

The following example illustrates this modification of the invention.

Example VII

Sixteen grams of ammonium biborate was added to 23.8 g. of 100% phosphoric acid, and well mixed in. A thick paste was formed, but as the temperature rose spontaneosuly to 70° C. this became smooth and thin. The paste was then heated rapidly up to 320° C. to dry it. During the drying the paste frothed up to several times its original volume, and the final product was a hard, white porous solid of surface area 16 m.²/g.

When a similar paste was dried as much as possible at 120° C. and then heated to 320° C., the product obtained was a dense and non-porous hard solid.

I, therefore, particularly point out and distinctly claim as my invention:

1. The method for producing unsupported boron phosphate of high surface area and catalytic activity which comprises heating an admixture of ammonium biborate and phosphoric acid rapidly to a temperature in the range of about 200°–350° C. to form a dry, porous product.

2. The method according to claim 1 in which said phosphoric acid is of 80% to 100% concentration.

References Cited

Cherbuliez et al.: Helvetica Chimica Acta, vol. 36, pp. 911–914 (1953).

OSCAR R. VERTIZ, *Primary Examiner.*

H. S. MILLER, *Assistant Examiner.*